US011256257B2

(12) United States Patent
Berestov et al.

(10) Patent No.: US 11,256,257 B2
(45) Date of Patent: Feb. 22, 2022

(54) METHOD OF MULTI-DRONE CAMERA CONTROL

(71) Applicant: Sony Group Corporation, Tokyo (JP)

(72) Inventors: Alexander Berestov, San Jose, CA (US); Cheng-Yi Liu, San Jose, CA (US); Jianfei Chen, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/917,671

(22) Filed: Jun. 30, 2020

(65) Prior Publication Data

US 2021/0405637 A1  Dec. 30, 2021

(51) Int. Cl.
*G05D 1/00* (2006.01)
*H04N 5/232* (2006.01)
*H04N 13/296* (2018.01)
*G05D 1/10* (2006.01)

(52) U.S. Cl.
CPC ......... *G05D 1/0094* (2013.01); *G05D 1/0022* (2013.01); *G05D 1/104* (2013.01); *H04N 5/23216* (2013.01); *H04N 5/23299* (2018.08); *H04N 13/296* (2018.05)

(58) Field of Classification Search
None
See application file for complete search history.

(56) References Cited

U.S. PATENT DOCUMENTS

| 9,104,201 | B1 | 8/2015 | Pillai et al. | |
|---|---|---|---|---|
| 10,416,667 | B2 | 9/2019 | Berestov et al. | |
| 2015/0301529 | A1* | 10/2015 | Pillai | G08G 5/0069 701/2 |
| 2017/0329324 | A1* | 11/2017 | Bachrach | G01C 23/00 |

FOREIGN PATENT DOCUMENTS

| KR | 101945019 B1 | 2/2019 |
|---|---|---|
| WO | WO2018213860 A1 | 11/2018 |

OTHER PUBLICATIONS

Swarms of Unmanned Aerial Vehicles—A Survey https://www.sciencedirect.com/science/article/pii/S2452414X18300086; Tahir et al. ; Journal of Industrial Information Integration 16 (2019) 100106 ; 7 pages.
Feedback formation control of UAV swarm with multiple implicit leaders; He et al.; Aerospace Science and Technology 72 (2018) 327-334 ; 8 pages.
UAV Swarm Coordination using Cooperative Control for establishing a Wireless Communications Backbone; Sivakumar et al.; 8 pages.

* cited by examiner

*Primary Examiner* — Heather R Jones
(74) *Attorney, Agent, or Firm* — Trellis IP Law Group, PC (57) ABSTRACT

A method of camera control for a camera capturing images of a target includes a sequence of at least four steps. The first step determines in real time a location of a drone and a pose of a camera on the drone. The second step, which may occur before or after the first step, determines in real time a location of a reference object, the location of the reference object having a fixed relationship to a location of the target. The third step uses the determined locations to calculate a distance, characterized by magnitude and direction, between the target and the drone. The fourth step uses the calculated distance to control the pose of the camera such that an image captured by the camera includes the target. Controlling the pose of the camera does not require any analysis of the captured image.

20 Claims, 5 Drawing Sheets

METHOD OF MULTI-DRONE CAMERA CONTROL

BACKGROUND

In drone cinematography, a drone-carried camera must have the correct position and orientation to capture the target in each image according to the movie director requirements. Even if the drone is correctly positioned and oriented, if the orientation—defined for the purposes of this disclosure as pose—of a camera on the drone is incorrect, or if camera parameters (such as a focal length setting, for example) are inappropriate, a captured image may miss the target or at least be sub-optimal in quality (in being out of focus, for example). The control of multiple cameras in a multi-drone system is particularly complicated because both the target, an actor for example, and the drones may be moving, and the pose of each camera may not be completely determined by the pose of the corresponding drone even when static, let alone moving. Current approaches to the problem involve scrupulously following a previously prepared script that details planned movements of the target/actor, and the drone trajectories, camera poses, and camera settings (image capture parameters) necessary to track that target over time and take good pictures.

In some cases, there may be more than one target of interest, with subsets of one or more drones directed to image different ones of those targets. It should be noted that a target of interest, to be imaged, may not be an actor, but some object or scene whose position varies according to the actor's position. One such example is an actor's shadow. In some cases the target may be a static scene, to be imaged from multiple different views.

Executing such complex, time-consuming tasks with the spatial and temporal coordination necessary to capture high quality image sequences is extremely challenging. Current systems are inadequate for achieving the combination of three significant factors: accuracy in locating the target and the drones, fast and precise drone movement responses to changes of target position, and adaptive control of camera pose and image capture parameters.

There is therefore a need for improved systems and methods that are not dependent on a high precision "target movement-drone trajectory-camera pose" script, but are focused on real time target localization, camera pose control, and image capture parameter control, suited to drone-carried cameras. Ideally, a general solution would be found that is not limited to particular approaches to drone swarm control, and that does not rely on computationally intensive visual data analysis. It may be desirable for the systems and methods to be sufficiently automated for a human operator controlling the drones and cameras to be optional, in providing fine tuning or responding creatively to unexpected occurrences, for example, rather than being essential to basic operations.

SUMMARY

Embodiments generally relate to methods and systems for camera control for capturing images of a target. In one embodiment, the method comprises a sequence of at least four steps. In a first step, a first technique is used to determine in real time a location of a drone and a pose of a camera on the drone. In a second step, which may occur before or after the first step, a second technique is used to determine in real time a location of the target. In a third step, the determined locations are used to calculate a distance, characterized by magnitude and direction, between the target and the drone. In a fourth step, the calculated distance is used to control the pose of the camera such that an image captured by the camera includes the target. Controlling the pose of the camera does not require any analysis of the captured image.

In one aspect, the fourth step further comprises optimizing image quality by controlling one or more image capture parameters of the camera, adjusting at least one image capture parameter on the basis of the calculated distance, the controlled image capture parameters including at least one of focal length, aperture, shutter speed, and zoom.

In another aspect, the sequence additionally comprises a fifth step after the fourth step. The fifth step comprises moving the drone to a position close to an anticipated next location of the moving target. The anticipation may be based either on a predefined motion script or by any real-time motion prediction methods, for example, the Kalman filter or its variants. The sequence is carried out repeatedly and sufficiently quickly to enable real time capture by the camera of a series of images of the target in motion.

In another embodiment, a method comprises a sequence of at least four steps. In a first step, a first technique is used to determine in real time, for each drone in a plurality of drones, a location of that drone, and a pose of a camera on that drone. In a second step, which may occur before or after the first step, a second technique is used to determine a location of the target. In a third step, for each one of the plurality of drones, the determined locations are used to calculate a distance, characterized by magnitude and direction, between the target and that drone. In a fourth step, for each one of the plurality of drones, the corresponding calculated distance is used to control the pose of the corresponding camera such that an image captured by that camera includes the target. Control of the pose of each camera does not require any analysis of the corresponding captured image.

In another embodiment, a system comprises one or more processors; and logic encoded in one or more non-transitory media for execution by the one or more processors and when executed operable to capture images of a target by carrying out a sequence of at least four steps. In a first step, a first technique is used to determine in real time, for each drone in a plurality of drones, a location of that drone, and a pose of a camera on that drone. In a second step, which may occur before or after the first step, a second technique is used to determine a location of the target. In a third step, for each one of the plurality of drones, the determined locations are used to calculate a distance, characterized by magnitude and direction, between the target and that drone. In a fourth step, for each one of the plurality of drones, the corresponding calculated distance is used to control the pose of the corresponding camera such that an image captured by that camera includes the target. Control of the pose of each camera does not require any analysis of the corresponding captured image.

A further understanding of the nature and the advantages of particular embodiments disclosed herein may be realized by reference of the remaining portions of the specification and the attached drawings.

DETAILED DESCRIPTION OF EMBODIMENTS

Throughout this disclosure, it should be understood that the terms "location", "orientation" and "pose" relate to three-dimensional characteristics, so that, for example, determining a location means determining a 3D location. The term "position" is used to encompass location and orientation or pose, making it a 6-dimensional characteristic. The term "distance" is a vector quantity, with magnitude and direction.

While many of the embodiments described below and shown in the figures assume the use of unmanned aerial vehicles (UAVs) incorporating cameras, the word "drone" is defined for the purpose of this disclosure as including any mobile device that includes a remoted operable camera. It may, for example, be ground based, or move underwater.

Figure 1:
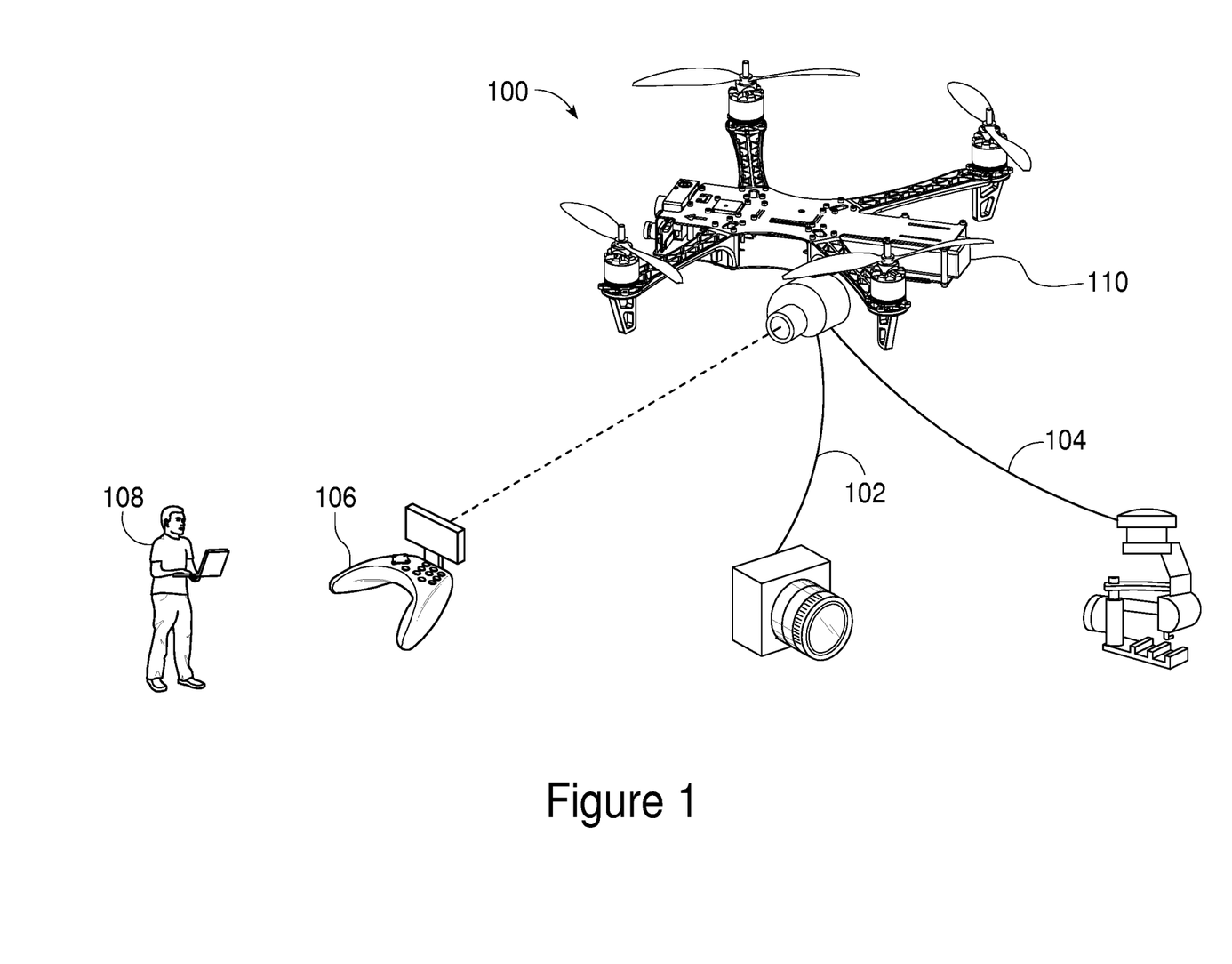
FIG. 1 illustrates a drone with a camera, operable according to one embodiment.

FIG. 1 illustrates a drone 100 used in some embodiments of the present invention. Drone 100 supports a camera 102 by means of a 3-dimensional gimbal arrangement 104. Images captured by camera 102 may be sent (see dashed line) as a video feed to a receiver 106, using a transmitter 110. Transmitter 110 may be separate from or included as part of a transceiver (not separately identified in the figure for simplicity) handling wireless data communication as required for determining drone location, and for controlling drone movement, drone pose, and camera pose, as will be described in more detail below. Real time monitoring of the video feed may optionally be carried out by an observer 108. For simplicity, the figure illustrates an integrated drone controller for both gimbal and camera control. Other possibilities include the use of two separate controllers, with either both being on the drone, or at a ground control station, or with one being on the ground to control the drone and the other on the drone to control the camera.

In some embodiments, drone 100 may carry more than one camera. In some embodiments, gimbal arrangement 104 may be replaced by some other controllable motion device, serving the same basic purpose of adjusting camera pose in a trackable, calibrated manner in response to commands received from a remote or local (drone) controller. Drone 100 includes an IMU, omitted from the figure for simplicity.

Figure 2:
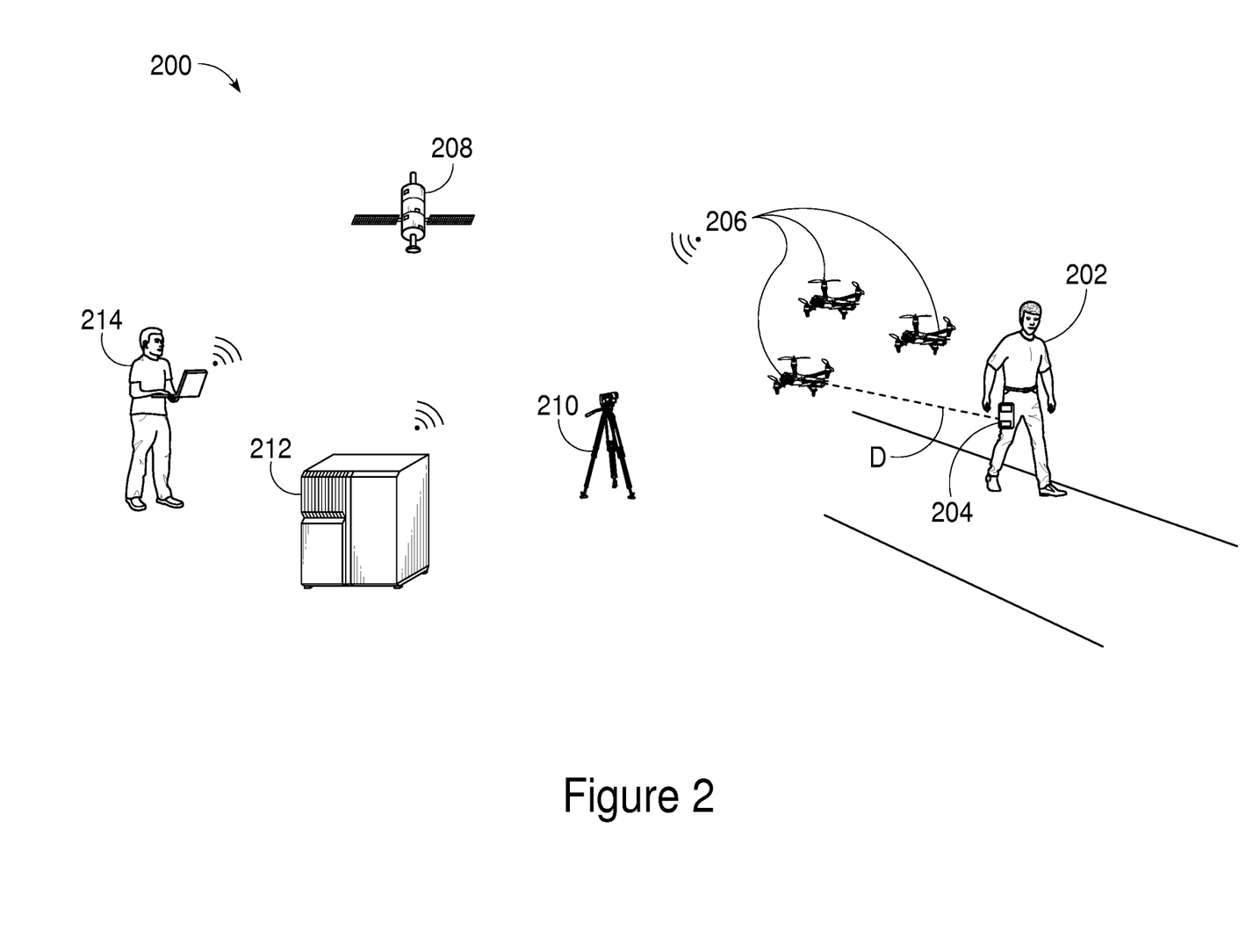
FIG. 2 illustrates a system according to some embodiments.

FIG. 2 schematically illustrates elements of a system 200 according to some embodiments of the present invention. The target in this case is a person 202, wearing or carrying a receiver module 204 that enables the person's location to be determined very accurately, in a 3D global coordinate system. In other embodiments, the target may be an animal or other object of interest. One technique to determine location depends on the global navigation satellite system (GNSS), represented here by the presence of satellite 208, combined with real-time kinematic positioning (RTK), represented here by RTK base station 210. The technique is referred to by the initialization RTK-GNSS. The output is expressed in a global coordinate system, as, for example, latitude, longitude and altitude.

In other embodiments, instead of an RTK-GNSS technique, using high quality wireless transmission, other well-known approaches such as LiDAR, stereo camera, RGBD, or multi-view triangulation, with known calibration and spatial transforms with respect to a global coordinate system, may be used to determine the target's location. In yet other embodiments, an RTK-GNSS-IMU technique may be used, meaning that module 204 includes an inertial measurement unit (IMU), incorporating sensing devices such as accelerometers, tilt sensors, RGBD cameras, stereo cameras etc. This option allows 6D position (3D orientation as well as 3D location) to be measured, with advantages to be described below.

Returning to FIG. 2, three drones 206 are shown in the vicinity of person 202, although there may be more or fewer drones in other cases, making up what is known as a drone swarm. The drones 206 may, for example, be of the same design shown in FIG. 1 as drone 100. The location of each drone 206 in the swarm may be determined very accurately using any one of the techniques mentioned above with regard to target location. In addition, the pose of the camera on the drone must be determined, which is typically done using an IMU (not shown) on each drone. So one convenient option to measure both drone location and camera pose is to use an RTK-GNSS-IMU system as described above.

It should be noted that the order in which the target and the drones are located is not critical; either one may be done before the other. In some cases, it may be useful to determine the pose of the target as well as the location of the target, for example if we want the face of a person to be visible in the captured image, or some other view of a target to be captured from a particular relative angle.

Once the locations of the target and the drones have been accurately determined, it is a relatively straightforward task to calculate the distance between each drone and the target. The dashed line in FIG. 2 indicates the distance D for one of the three drones 206. While shown as a 2D line in the plane of the figure, of course the distance is in reality a vector, with not just a magnitude but a direction that may be expressed in the same global coordinate system used for the target location.

Next, each calculated distance, or more specifically the direction of each calculated distance between a given drone and the target, is used to control the pose of the corresponding drone's camera, such that an image captured by that camera will necessarily include the target. It should be noted that, unlike other well-known approaches, controlling the poses of cameras in the present invention does not require any analysis of the captured image, being determined prior to image capture based on location and pose measurements and associated calculation. This reduces demands on time and computational resources, and it can be implemented automatically, without requiring human intervention, allowing for real-time multi-image capture.

In cases where the drone is designed such that the pose of its camera is fully determined by the pose of its corresponding drone, controlling camera pose is equivalent to controlling drone pose. In other cases, controlling camera pose may involve an initial step of controlling drone pose. Exactly how and where the control instructions are generated, transmitted, and implemented will vary according to the particular control and communication topology of a given application, with a centralized, ground-based control at one extreme, and a purely drone-centric evenly-distributed system at the other, as will be described in more detail below.

The sequence of determining target location, determining drones' locations and camera poses, calculating distances, and controlling camera poses accordingly, may be carried out repeatedly to enable a series of images of the target to be captured by each drone camera.

The description of the embodiments illustrated in FIG. 2 and other embodiments discussed below deal for convenience with cases where the term "target" is used both for a target of interest, a person for example, to be imaged and for a reference object co-located with that target, the reference object allowing that location to be accurately determined, as detailed above. In the illustrated case, the reference object is receiver module 240 worn by the person. In other cases, the reference object may be located at some distance from the target, but where the location of the former determines the location of the latter. For example, the reference object may be a module attached to a cap worn by a person, but the target of interest to be imaged may be part of the shadow cast on the ground by the person. Or the reference object may be a static marker, near a scenic viewpoint to be imaged, possibly by a subset of the drone swarm. It should be appreciated that systems and methods of the present invention may be applied to all these cases.

In some embodiments, further use is made of the calculated distance between the target (or reference object, if the two are not co-located) and each drone beyond controlling camera pose. Several adjustable camera parameters that strongly influence image quality depend directly or indirectly on the magnitude of the distance between a camera and the main object of interest in the image. One parameter of this type is the camera's focal length, which can be adjusted to keep the object in sharp focus. Others include, but are not limited to, aperture, shutter speed, camera zoom, frame rate, ISO values, white balance, and exposure (EV).

Zoom, for example, may be adjusted to keep the features of the object visible at a desired magnification. Image quality can therefore be optimized according to the target-drone separation. Just as noted above with regard to pose control, basing the adjustment of camera parameters on calculated distance avoids dependence on image analysis, and provides corresponding advantages in terms of speed, convenience, and ease of automation. Also as noted above, exactly how and where the control instructions are generated, transmitted, and implemented will vary according to the particular control and communication topology of a given application, with a centralized, ground-based control at one extreme, and a purely drone-centric evenly-distributed system at the other, as will be described in more detail below.

As mentioned above, some embodiments include the use of an RTK-GNSS-IMU technique for the target (or reference object, as explained above), meaning that the 3D orientation as well as the 3D location are measured. In these cases, it is possible to control camera pose not just to keep some representative point of the target in captured images but to do more sophisticated tracking and capture, by, for example, choosing a particular facet of the target to keep in view, as a target twists or leans over etc.

For simplicity, the discussion above has focused on relatively simple situations, where the target is static, and the initial positioning of the drones is adequate for good image capture. In many cases of interest, however, the target may be in motion, making a series of images over time desirable, and the target may cover enough ground that at least one drone of a swarm of drones will need to be moved for its camera to keep the target in view. This function can be implemented using one of several "swarm control" strategies.

In the embodiment of FIG. 2, a ground controlling station 212 is present, with a human operator 214, supervising and/or controlling the functions of individual drone status monitoring and feedback, swarm formation planning, individual drone fly commands, individual gimbal control and individual camera control. Swarm communication topologies other than the illustrated "star" topology may be used in other embodiments, where ground control is replaced by distributed control, with position data being directly exchanged between drones and the formation of the swarm determined by one "master" drone or a combination of some or all drones.

Figure 3:
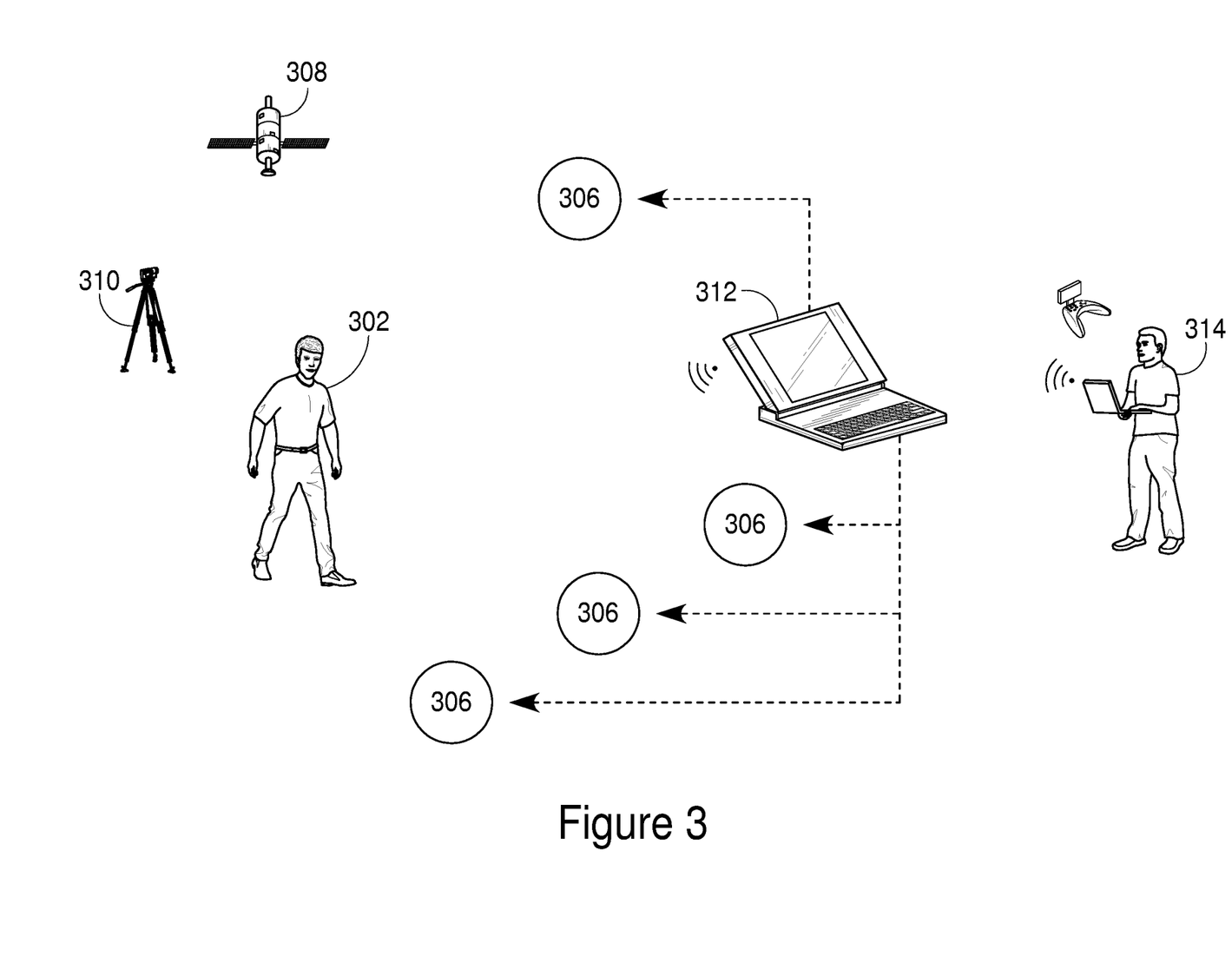
FIG. 3 illustrates a system according to some embodiments.

FIG. 3 schematically illustrates drone position and pose monitoring in one "star" embodiment, where determining the location and pose for each drone 306 comprises data exchange between a ground control station (GCS) 312, shared by the plurality of drones, and a drone controller (not shown) in each drone. Target (or reference object) 302, a GNSS satellite 308, an RTK base station 312, and optional human operator 314 are also shown. In some cases, one of the drones in the plurality of drones is a master drone, having a controller in direct or indirect communication with each other drone in the plurality.

Considering cases where movement of the swarm of drones is required to track a moving target, in some embodiments the GCS may use the current position of the target to determine the next swarm formation to be created. It then computes the position of each drone under that formation and sends the individual movement command to each drone. In other embodiments, the drones may simply move according to a predefined script of swarm formation and flying trajectories, but it should be noted that any imprecision in the motion of the drones following the script can be accommodated (unlike in prior art systems) as the positions and poses may be continuously monitored and tracked, using RTK-GNSS-IMU technology or one of the alternatives mentioned above. Various embodiments may readily be envisaged with different methods of swarm control and individual drone movement involving one or a combination of ground control, one or more human operators, self-determination for the whole swarm by a subset of drone controllers, etc.

A similar variety of scenarios will of course exist for control of camera pose and image capture parameters.

In these "moving target" cases, the sequence of operations (of determining target (reference object) location, determining drones' locations and poses, calculating distances, controlling camera poses accordingly, and capturing images) has to be extended to include moving the drones to the next anticipated target position, and the extended sequence is repeated as many times as desired to enable a series of images tracking the moving target of interest to be captured by each drone camera. The various operations have to be carried out sufficiently quickly, of course, for the series of images to make up a real-time video stream that adequately tracks the moving target of interest.

Figure 4:
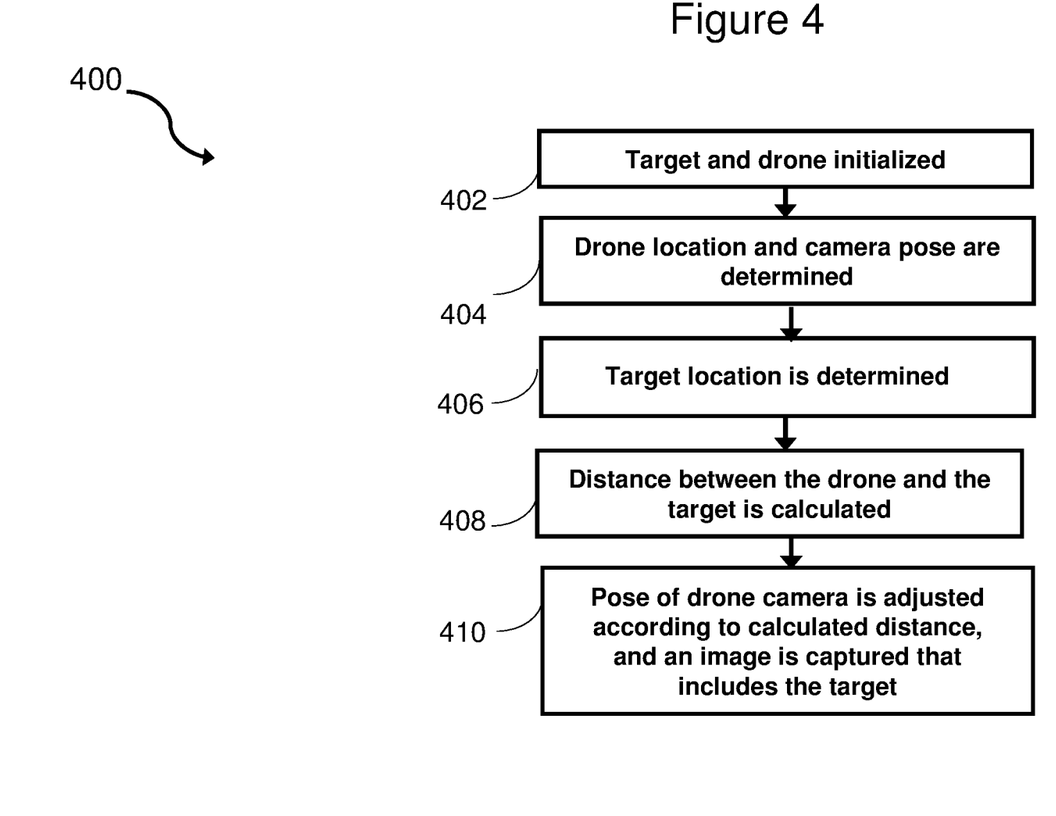
FIG. 4 is a flowchart of a method according to some embodiments.
Figure 5:
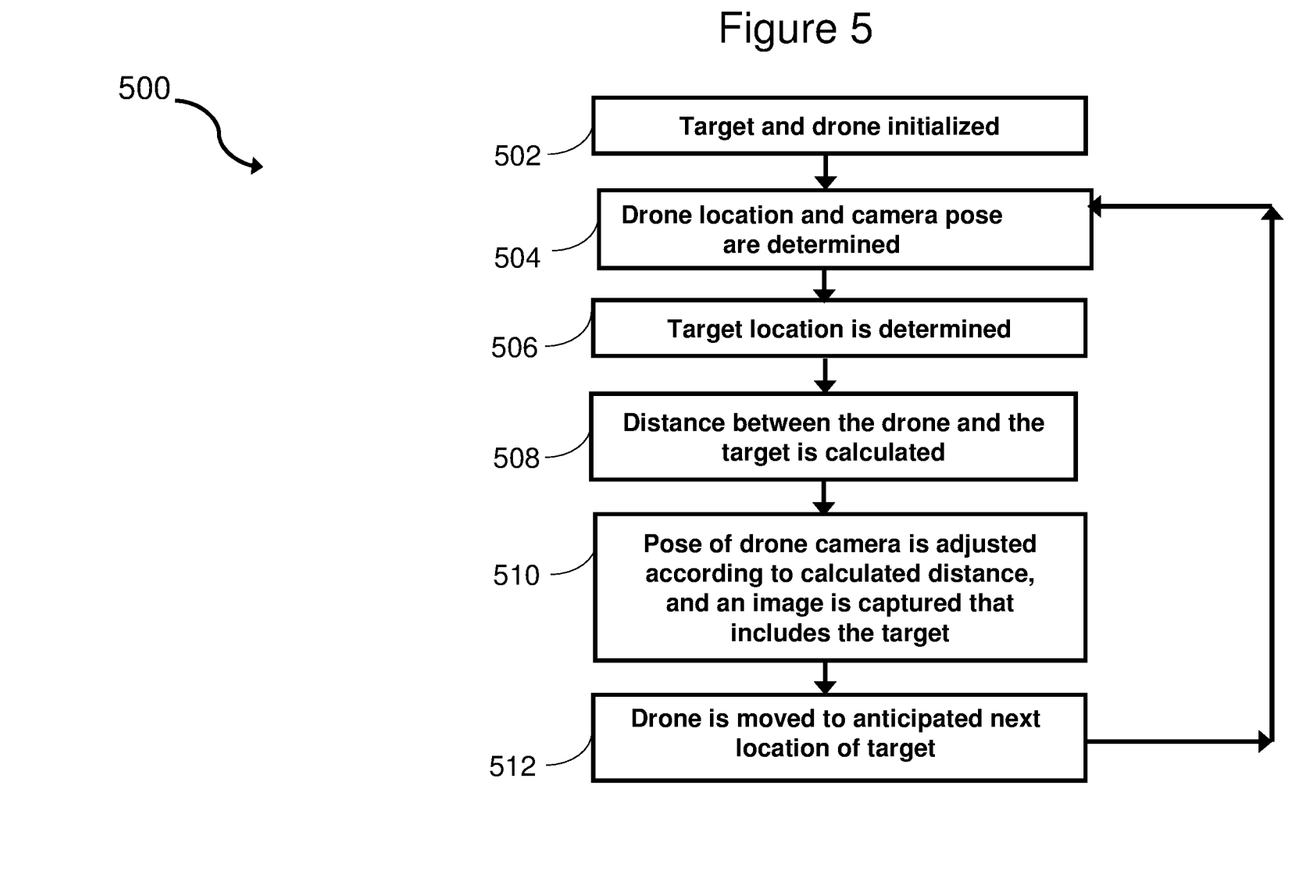
FIG. 5 is a flowchart of a method according to some other embodiments.

FIGS. 4 and 5 are flowcharts showing steps of methods according to embodiments directed respectively to static and moving targets, as discussed above.

FIG. 4 illustrates method 400, which begins with an initialization step 402, at which a drone is positioned in the vicinity of a target of interest. At step 404, an accurate determination of the location of the target (or reference object) is made, using a first technique, such as an RTK-GNSS technique. A typical accuracy achievable with an RTK-GNSS system is 2 cm at a range of 10 km. At step 406, accurate determinations of the drone location and camera pose are made, using a second technique such as an RTK-GNSS-IMU technique. In some embodiments, the order in which steps 404 and 406 may be reversed. At step 408, a distance between the target (or reference object) and the drone is calculated from the location determinations made in the previous two steps. At step 410, the pose of the camera on the drone is adjusted according to the calculated distance (or more precisely according to the direction of the calculated distance) so that an image captured at that pose includes the target of interest.

While FIG. 4 illustrates the case for a single drone, and a single image capture, method 400 could clearly be modified to cover other embodiments where a plurality of drones is involved, each with a camera capturing an image from its own viewpoint.

FIG. 5 illustrates method 500, for embodiments with a moving target. Steps 502 through 510 are the same as steps 402 through 410 of method 410, but at step 512, the drone is moved to an anticipated next location of the target, and the method flow loops back to step 504. The new drone location and camera pose, and the actual (as opposed to anticipated) location of the target (or reference object) are accurately measured as before (in steps 504 and 506), the new distance calculated (in step 508) and a correspondingly adjusted camera pose used for a new image capture (in step 510). In this way, a series of images of a moving target may be captured in real time, moving the drone and adjusting its camera pose as necessary, based on location measurements, independent of any image analysis on the actual captured images of the target of interest.

While FIG. 5 illustrates the case for a single drone, method 500 could clearly be modified to cover other embodiments where a plurality of drones is involved, each with a camera capturing a series of images from its own viewpoint.

Although the description has been described with respect to particular embodiments thereof, these particular embodiments are merely illustrative, and not restrictive. In some embodiments, as noted above, the target of interest to be imaged may be a human or an animal. It should be noted that other living or inanimate objects, static or in motion on the ground or in the air, may also be tracked and imaged by embodiments of the present invention. Moreover, it may be desirable, even during a single session of image capturing, for a drone swarm capturing images of one target to be repositioned and directed to take pictures of a different target, or for the swarm to be split up into sub-groups, with each sub-group focused on a different target. The techniques and options discussed above in this disclosure could readily be adapted to deal with these situations.

Other advantageous features of the present invention include the possibilities of building an effective 3D model or point cloud of a mobile target, of shortening the image capturing time, and of generating scenes from physically impossible viewpoints, by efficiently synthesizing images captured from multiple viewpoints simultaneously.

Many other possibilities may easily be envisaged without departing from the spirit of the present invention.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method of automatic camera control for a camera capturing images of a target, the method comprising:
a sequence of at least four steps, the sequence comprising:
in a first step, using a first technique to determine in real time a location of a drone and a pose of a camera on the drone;
in a second step, which may occur before or after the first step, using a second technique to determine in real time a location of a reference object, the location of the reference object having a fixed relationship to a location of the target;

in a third step, using the determined locations to calculate a distance, characterized by magnitude and direction, between the reference object and the drone; and in a fourth step, using the calculated distance to control the pose of the camera such that an image captured by the camera includes the target;

wherein controlling the pose of the camera does not require any analysis of the captured image; and wherein no human participation or intervention is required during execution of the sequence.

2. The method of claim 1, wherein the fourth step further comprises optimizing image quality by controlling one or more image capture parameters of the camera, adjusting at least one image capture parameter on the basis of the calculated distance, the controlled image capture parameters including at least one of focal length, aperture, shutter speed, and zoom.

3. The method of claim 1,
wherein the sequence additionally comprises a fifth step after the fourth step, the fifth step comprising moving the drone to a position close to an anticipated next location of the target; and wherein the sequence is carried out repeatedly and sufficiently quickly to enable real time capture by the camera of a series of images tracking the target in motion.

4. The method of claim 1,
wherein the first technique is an RTK-GNSS-IMU technique; and wherein the second technique comprises one of an RTK-GNSS-IMU technique, LiDAR, use of a stereo camera, use of an RGBD camera, and multi-view triangulation.

5. The method of claim 1, wherein determining the location and pose of the drone comprises data exchange between a Ground Control Station and a drone controller in the drone.

6. The method of claim 1, wherein controlling the pose of the camera comprises using a 3D gimbal controlled by one of: an integrated drone controller in the drone, a dedicated camera controller in the drone, and an external camera controlling station.

7. A method of automatic camera control for a plurality of cameras capturing images of a target, the method comprising:

a sequence of at least four steps, the sequence comprising:
in a first step, using a first technique to determine in real time, for each drone in a plurality of drones, a location of that drone and a pose of a camera on that drone;

in a second step, which may occur before or after the first step, using a second technique to determine a location of a reference object, the location of the reference object having a fixed relationship to a location of the target;

in a third step, for each one of the plurality of drones, using the determined locations to calculate a distance, characterized by magnitude and direction, between the reference object and that drone; and in a fourth step, for each one of the plurality of drones, using the corresponding calculated distance to control the pose of the corresponding camera such that an image captured by that camera includes the target;

wherein control of the pose of each camera does not require any analysis of the corresponding captured image; and wherein no human participation or intervention is required during execution of the sequence.

8. The method of claim 7, wherein the fourth step further comprises optimizing image quality by controlling one or more image capture parameters of the camera, adjusting at least one image capture parameter on the basis of the calculated distance, the controlled image capture parameters including at least one of focal length, aperture, shutter speed, and zoom.

9. The method of claim 7,
wherein the sequence comprises a fifth step after the fourth step, the fifth step comprising, for each drone in the plurality of drones, moving the drone to a position close to an anticipated next location of the target; and wherein the sequence is carried out repeatedly and sufficiently quickly to enable real time capture by the camera of a series of images tracking the target in motion.

10. The method of claim 9 wherein the first technique is an the RTK-GNSS-IMU technique, and the second technique is one of an RTK-GNSS-IMU technique, LiDAR, stereo cameras, an RGBD camera, and multi-view triangulation.

11. The method of claim 9, wherein moving each drone to a position close to an anticipated next location of the moving target does not depend on calculating the anticipated next location based on any predetermined plan of motion for the target.

12. The method of claim 9, wherein moving each drone to a position close to an anticipated next location of the moving target is carried out in part under supervision by a human operator.

13. The method of claim 7, wherein determining the location and pose of each drone comprises data exchange between a Ground Control Station, shared by the plurality of drones, and a drone controller in each drone.

14. The method of claim 7,
wherein one of the drones in the plurality of drones is a Master Drone, having a controller in direct or indirect communication with each other drone in the plurality; and wherein determining the location and pose of each drone comprises data exchange between a Ground Control Station (GCS) and the controller in the Master drone, no communication occurring between the GCS and any other drone in the plurality except for the Master drone.

15. The method of claim 7, wherein the plurality of drones is distributed in space according to a pattern that changes over time, changes in the pattern occurring under control of at least one of: a Ground Control Station communicating directly with each drone, and a distributed control system comprising communication between controllers on different ones of the drones in the plurality of drones.

16. The method of claim 7, wherein controlling the pose of each camera comprises using a 3D gimbal controlled by one of: an integrated drone controller in the corresponding drone, a dedicated camera controller in the corresponding drone, and a camera controlling station shared by all drones in the plurality of drones.

17. A system of automatic camera control for a plurality of cameras capturing images of a target, the system comprising:
one or more processors; and logic encoded in one or more non-transitory media for execution by the one or more processors and when executed operable to capture images of a target by carrying out a sequence of at least four steps, the sequence comprising:

in a first step, using a first technique to determine in real time, for each drone in a plurality of drones, a location of that drone and a pose of a camera on that drone;

in a second step, which may occur before or after the first step, using a second technique to determine a location of a reference object, the location of the reference object having a fixed relationship to a location of the target;

in a third step, for each one of the plurality of drones, using the determined locations to calculate a distance, characterized by magnitude and direction, between the target and that drone; and in a fourth step, for each one of the plurality of drones, using the corresponding calculated distance to control the pose of the corresponding camera such that an image captured by that camera includes the target;

wherein control of the pose of each camera does not require any analysis of the corresponding captured image; and wherein no human participation or intervention is required during execution of the sequence.

18. The system of claim 17, wherein the fourth step further comprises optimizing image quality by controlling one or more image capture parameters of the camera, adjusting at least one image capture parameter on the basis of the calculated distance, the controlled image capture parameters including at least one of focal length, aperture, shutter speed, and zoom.

19. The system of claim 17, wherein the sequence additionally comprises a fifth step after the fourth step, the fifth step comprising, for each drone in the plurality of drones, moving the drone to a position close to an anticipated next location of the moving target; and wherein the sequence is carried out repeatedly and sufficiently quickly to enable real time capture by the camera of a series of images tracking the target in motion.

20. The system of claim 17 wherein the first technique is an the RTK-GNSS-IMU technique, and the second technique is one of an RTK-GNSS-IMU technique, LiDAR, stereo cameras, an RGBD camera, and multi-view triangulation.

* * * * *